United States Patent
Ekudden et al.

(10) Patent No.: US 6,721,327 B1
(45) Date of Patent: Apr. 13, 2004

(54) DELAYED PACKET CONCEALMENT METHOD AND APPARATUS

(75) Inventors: Erik Ekudden, Åkersberga (SE); Tomas Gunde Svensson, Stockholm (SE); Jim Sundqvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/312,557

(22) Filed: May 14, 1999

(30) Foreign Application Priority Data

May 14, 1998 (SE) .............................. 9801725

(51) Int. Cl.[7] .............................. H04B 1/10; H04J 3/24; G10L 15/00
(52) U.S. Cl. .................. 370/395.61; 370/435; 704/233; 704/246
(58) Field of Search ................................ 370/352, 389, 370/395.1, 395.6, 395.61, 428, 434, 435, 516, 517; 375/340, 341, 343, 350; 704/231, 233, 246, 258, 500, 503, 228

(56) References Cited

U.S. PATENT DOCUMENTS

| | | | |
|---|---|---|---|
| 4,726,019 A | * | 2/1988 | Adelmann et al. ............ 370/94 |
| 5,457,678 A | | 10/1995 | Goeldner ..................... 370/13 |
| 5,572,622 A | * | 11/1996 | Wigren et al. .............. 395/2.37 |
| 5,596,678 A | * | 1/1997 | Wigren et al. .............. 395/2.37 |
| 5,615,214 A | | 3/1997 | Chandos et al. ............. 370/349 |
| 5,657,316 A | | 8/1997 | Nakagaki et al. ........... 370/394 |
| 6,175,871 B1 | * | 1/2001 | Schuster et al. ............. 709/231 |

FOREIGN PATENT DOCUMENTS

EP 0805572 A2 * 11/1997 ............. H04L/1/00

OTHER PUBLICATIONS

Clüver, Kai, "An ATM Speech Codec with Improved Reconstruction of Lost Cells", Proceedings Eusipco1996.

Nobuhiko Naka, "Improved Error Resilience in Mobile Audio–Visual Communications", IEEE, pp. 702–706.

* cited by examiner

Primary Examiner—Alpus H. Hsu

(57) ABSTRACT

A decoder improves delayed packet concealment in a packet network by using two decoder sections. A first decoder section bases its decoding during the concealment phase on erroneous filter states and a set of speech parameters, whereas a second decoder section bases its decoding on saved and updated filter states and the same speech parameters. The outputs of the two decoder sections are thereafter combined to form the final speech signal. This decoding strategy produces a speech signal with smooth transitions from delayed to non-delayed packets and uses information from the most recent packets for speech generation.

15 Claims, 7 Drawing Sheets

DELAYED PACKET CONCEALMENT METHOD AND APPARATUS

TECHNICAL FIELD

The present invention relates to a delayed packet concealment method and apparatus in a packet network that uses delayed parameters to improve concealment of delayed packets.

BACKGROUND

Digitally compressed speech signals are often transmitted in packets containing speech parameters for reconstructing speech frames in a decoder at the receiving end. Typical examples of such packet networks are IP and ATM networks. When packets are delayed or lost, some sort of concealment method is used to cover for the delayed or lost speech parameters (see citation ([1]). Typically these concealment methods comprise predicting the speech parameters for a delayed or lost packet from previously received parameters, and applying the predicted parameters to the decoding process instead of the delayed or lost parameters. The parameters of the first delayed or lost packet are usually simply copied from the previous packet. If further packets are delayed or lost, the same parameters are still used, but now the output signal is gradually muted. A characteristic feature of these methods is that the same strategy is used both for delayed and lost packets. A drawback of these methods is that the information in delayed packets is simply discarded, although it is more up to date than the information that is used for parameter prediction.

A method that distinguishes between delayed and lost packets is described in citation [2]. In the method described in this document speech parameters in delayed packets replace predicted parameters as soon as the delayed packet arrives. However, a characteristic feature of this method is that it does not consider the fact that the decoder is based on digital filtering. Digital filters in the decoder reach final filter states after decoding of a frame. These final filter states are used as initial filter states for the decoding of the next frame (with the new speech parameters). If the decoded output signal is to be the same signal as the optimal signal that was produced in the analysis-by-synthesis process in the encoder at the transmitting end, both speech parameters and initial filter states have to be the same. In the method described in citation [2], only the correct speech parameters will be used when a delayed packet eventually arrives. However, in the meantime the filter states have drifted away from the final state of the previous frame during the prediction phase, which leads to annoying abrupt output signal changes when the delayed speech parameters are suddenly applied.

SUMMARY

An object of the present invention is to provide a delayed packet concealment method and apparatus that uses information in delayed packets, but in which such annoying abrupt output signal changes are minimized or even eliminated.

Briefly, the present invention involves using the information received in delayed packets to update not only the speech parameters, but also the initial decoder state. During delayed packet concealment two decoded output signals are then generated with the same speech parameters, one based on drifted decoder states and one based on updated decoder states. Thereafter these two output signals are weighted together into a final output signal. This procedure makes the transition from predicted to updated speech parameters smoother.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
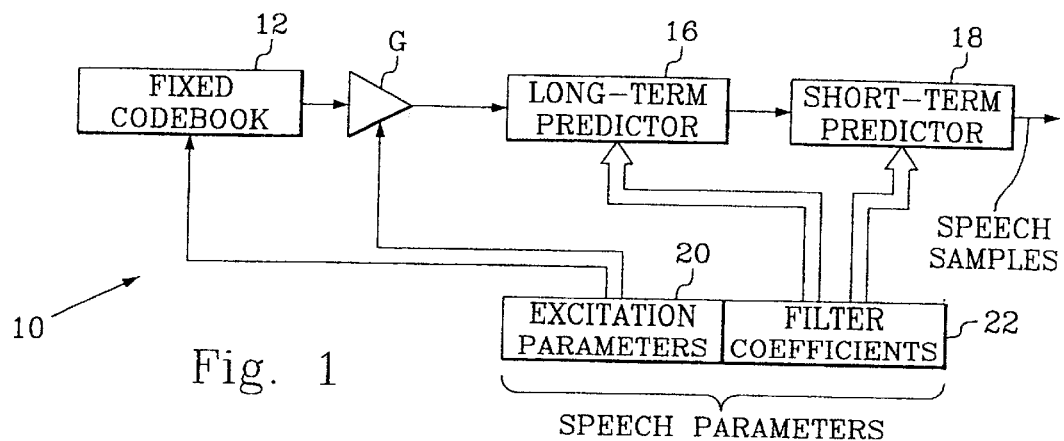
FIG. 1 is a block diagram of a typical speech decoder.

FIG. 1 is a block diagram of a typical speech decoder 10. A fixed codebook 12 contain excitation vectors that are used to reconstruct a speech signal. The excitation vector selected from the fixed codebook 12 is weighted by a gain factor G. This final excitation vector is forwarded to a long-term predictor (digital filter) 16. The output signal from long-term predictor 16 is forwarded to a short-term predictor (another digital filter) 18, which outputs the decoded speech samples. The described decoder is controlled by received speech parameters. These parameters may be divided into two groups, namely excitation parameters 20 and filter coefficients 22. The excitation parameters 20 control the selection of fixed codebook vector and set the gain factor G. The filter coefficients 22 determine the transfer functions of long-term and short-term predictors 16, 18.

In order to explain the present invention, some characteristic features of digital filters will first be discussed with reference to FIG. 2.

Figure 2:
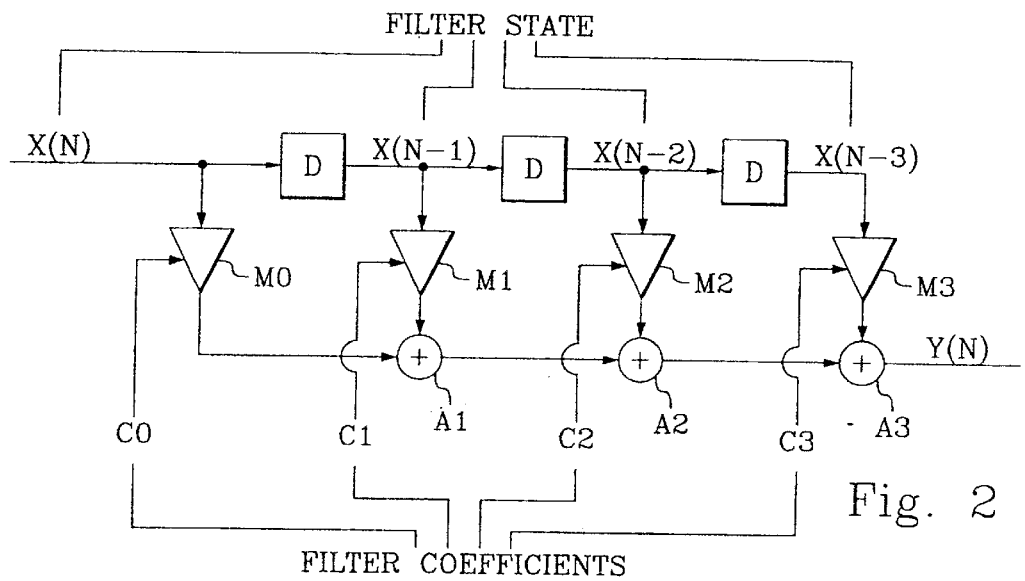
FIG. 2 is a block diagram of a FIR filter.

FIG. 2 is a block diagram of a FIR filter. This type of filter may be used in short-term predictor 20. The filter includes a chain of delay elements D (the figure only shows 3 delay elements, but more elements are of course possible). A set of multipliers M0, M1, M2, M3 tap the input signal X(N) and the delayed signals X(N-1), X(N-2), X(N-3) and multiply these signals by filter coefficients C0, C1, C2, C3, respectively. Finally these multiplied signals are added in adders A1–A3 to form the output signal Y(N) of the filter. The set of signals X(N), X(N-1), X(N-2), X(N-3) form the filter state. From this description it is clear that the filter output signal Y(N) will depend not only on the filter coefficients, but also on the initial filter state. The filter is said to have "memory". This memory is the cause of the abrupt signal changes that occur in the prior art decoders when only the filter coefficients are updated. In the case of a FIR filter the influence an erroneous filter state will depend on the length of the filter. Fewer filter taps will give a shorter memory. On the other hand, in the case of an IIR filter, as is typically used in long-term predictor 18, the memory is infinite.

Figure 3:
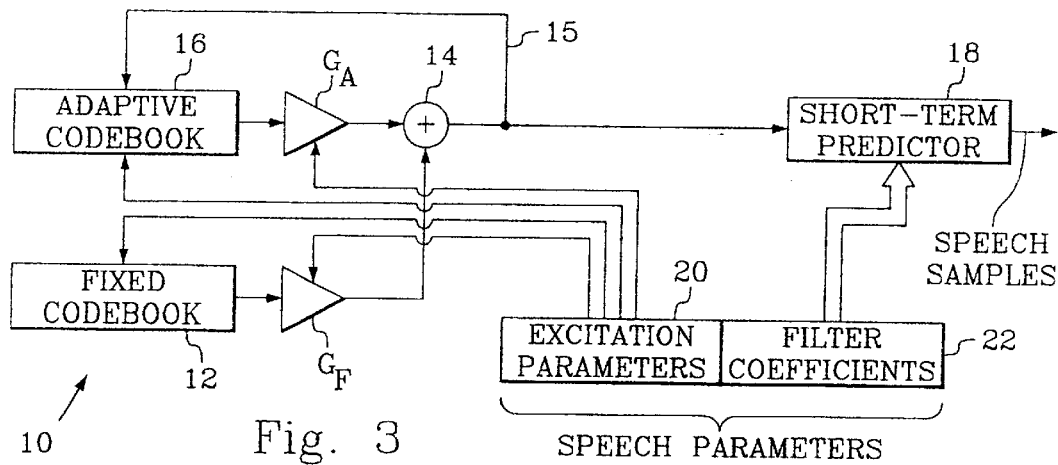
FIG. 3 is a block diagram of another typical speech decoder.

In the embodiment of FIG. 1 decoder 10 has been realized by implementing long-term predictor 18 as a digital filter. Another embodiment is a decoder in which the long-term predictor is implemented as an adaptive codebook instead, as illustrated in FIG. 3. An adaptive codebook performs the same function as a long-term predictor, but is not implemented exactly as a digital filter. Instead an adaptive codebook 16 is a long speech sample buffer that is continuously updated by a feedback line 15 as the decoding proceeds. Vectors are selected by pointing to certain parts of this long buffer. In this embodiment the excitation parameters will contain such a pointer on also a gain factor $G_A$ for the selected adaptive codebook vector. Since the adaptive codebook is updated with new samples as decoding proceeds, it is appreciated that the decoded speech samples of a frame will depend on the initial state of the adaptive codebook. Thus, the adaptive codebook has "memory" like a digital filter. In order to cover both embodiments the term "initial decoder state" may therefore be used.

Figure 4:
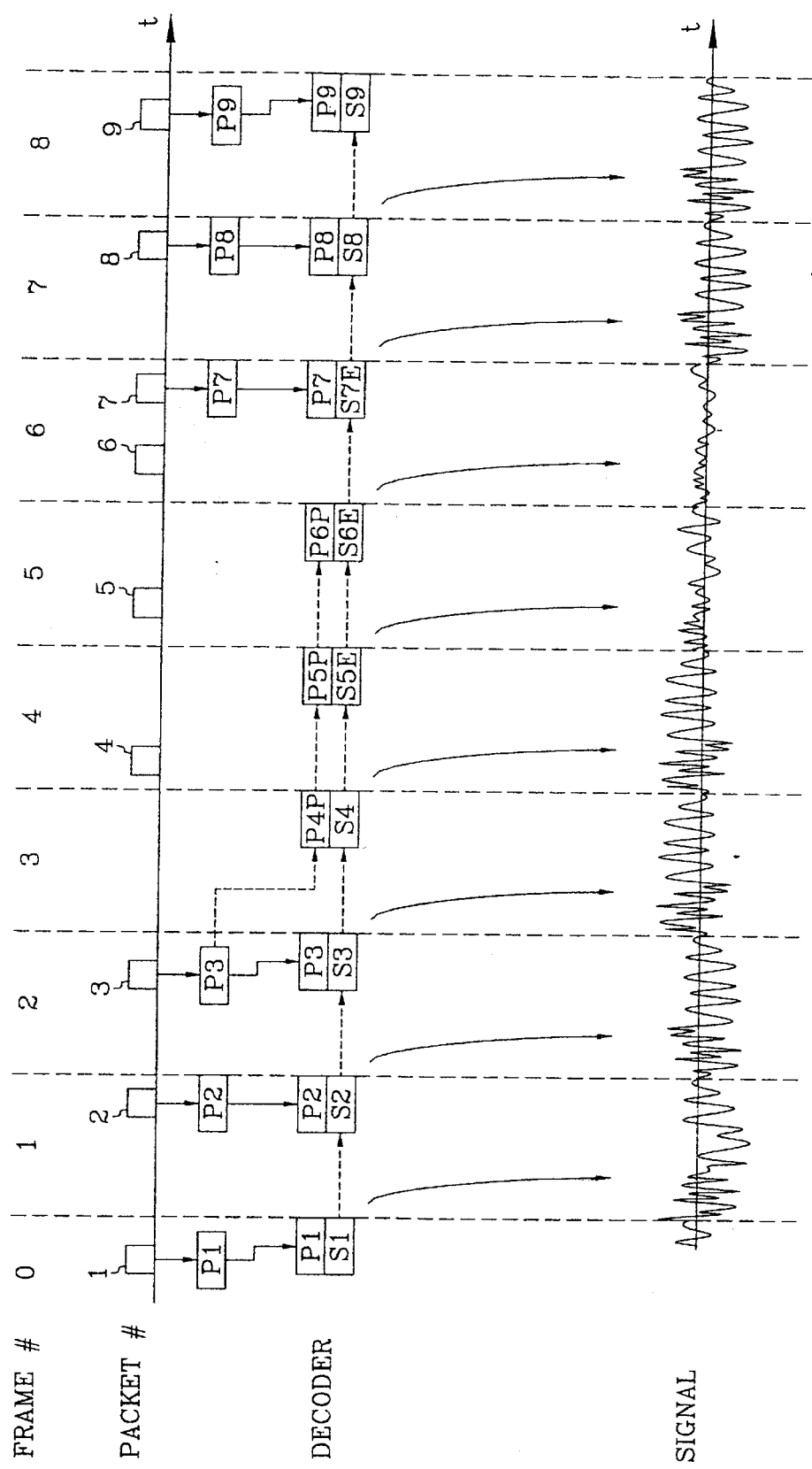
FIG. 4 is a timing diagram illustrating a prior art delayed packet concealment method.

FIG. 4 is a timing diagram illustrating a prior art delayed packet concealment method. A receiver including a decoder receives packets 1–9. Speech parameters P1–P3 and P7–P9 are extracted from the packets that were received in time for decoding, while the delayed packets 4–6 are simply ignored. The extracted parameters P1–P3 are forwarded to the decoder and together with the corresponding initial decoder states S1–S3 will produce the speech signal for frames 1–3. The dashed lines between initial decoder states, for example between initial decoder states S2 and S3, indicate that the later initial decoder state is obtained from the previous initial decoder state if the indicated speech parameters (P2 in this example) are used for decoding. Since packet 4 is delayed, speech parameters for frame 4 are not available. Therefore these speech parameters are predicted from the previous speech parameters P3. One often used prediction method is to simply use the same speech parameters as in the previous frame. The predicted speech parameters for frame 4 are denoted P4P in the figure. Thus, frame 4 will be decoded with correct initial decoder state S4, but with predicted speech parameters P4P. Since packet 5 is also delayed, speech parameters have to be predicted also for frame 5. However, since packet 5 has been ignored the new prediction P5P has to be based on the previous prediction P4P. One often used prediction method is to once again use the speech parameters from the previous frame, but to reduce the energy of the output signal. Furthermore, since frame 4 was decoded with predicted speech parameters P4P, the initial decoder state for frame 5 will not be the correct initial decoder state S5, but erroneous initial decoder state S5E. Since packet 6 is also delayed, the same process (copying speech parameters from previous frame, reducing energy and basing decoding on an erroneous initial decoder state) as in frame 5 is repeated for frame 6. Since packet 7 arrives on time, its speech parameters P7 will be used for decoding frame 7. However, since the previous frames have been decoded with predicted speech parameters, the initial decoder state S7E will be erroneous. This circumstance together with the sudden amplitude increase due to the correctly received speech parameters will produce an abrupt change in the decoded speech signal. After decoding of frame 7 the influence of the "memory" in the decoder is negligible (in some types of decoders; other types may have longer "memory"), and therefore frame 8 will be correctly decoded if packet 8 arrives on time.

Figure 5:
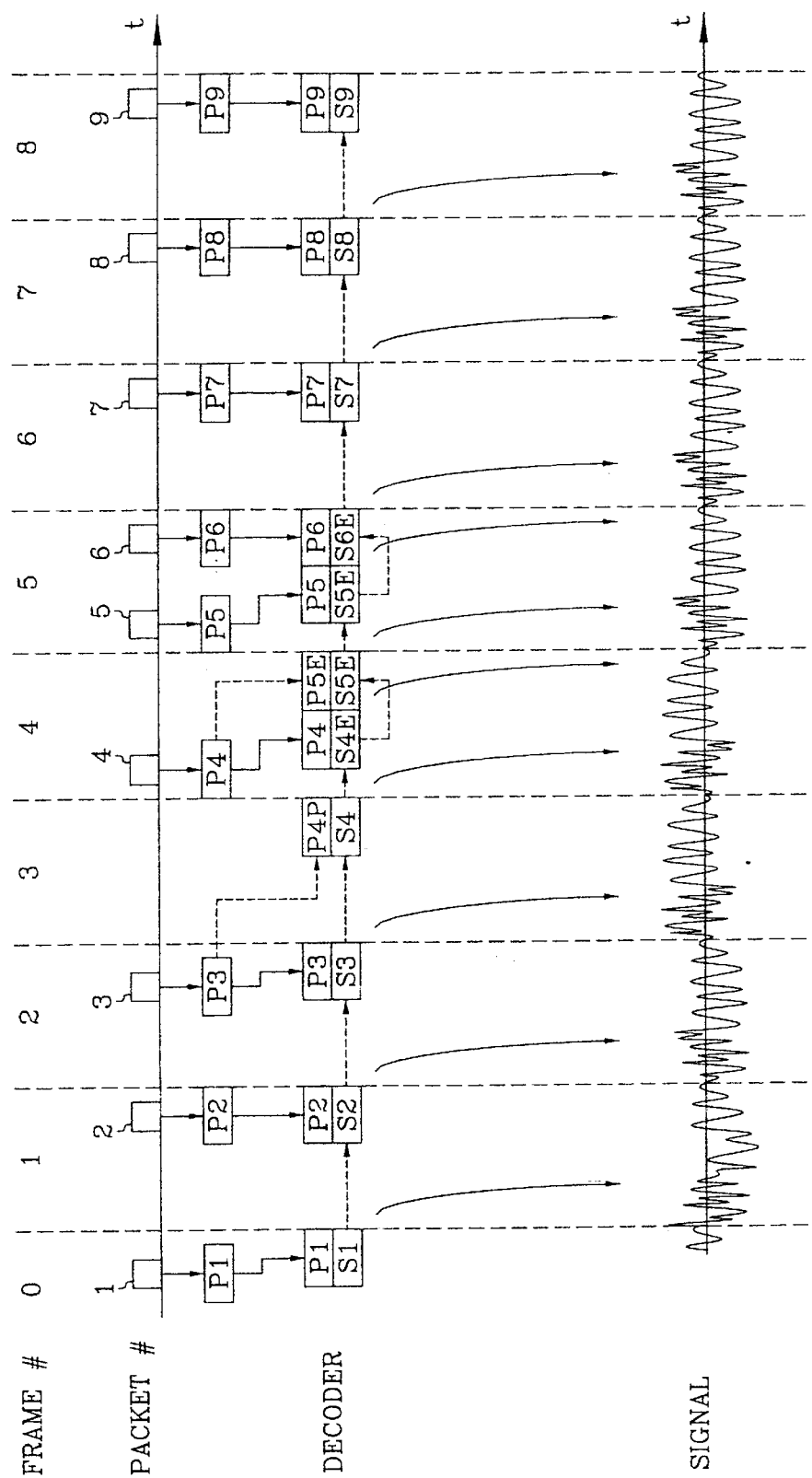
FIG. 5 is a timing diagram illustrating another prior art delayed packet concealment method.

FIG. 5 is a timing diagram illustrating another prior art delayed packet concealment method described in citation [2]. As previously packets 1–3 arrive on time and are decoded normally. The speech parameters for frame 4 are predicted, since packet 4 is delayed. These predicted speech parameters are used to start decoding of frame 4. However, when packet 4 arrives it is not ignored as in FIG. 4. Instead speech parameters P4 are extracted and immediately used for decoding. The predicted speech samples that have not yet been outputted are then replaced by speech samples based on correct speech parameters P4 but erroneous initial decoder state S4E. However, this leads to an annoying abrupt output signal change. Assuming that packet 5 is also delayed, speech parameters P5P are predicted from speech parameters P4. These predicted parameters P5P and erroneous initial decoder state S5E are used to decode frame 5. Once packet 5 arrives, the predicted speech samples that have not yet been outputted will be replaced by decoded speech samples based on late arriving speech parameters P5 and an erroneous initial decoder state S5E (the two states denoted S5E need not be the same, the notation just indicates that they are erroneous). This leads to another abrupt signal change, When packet 6 arrives on time and is used to decode frame 6. Thereafter decoding is normal again, since packets 7–9 arrive on time.

Figure 6:
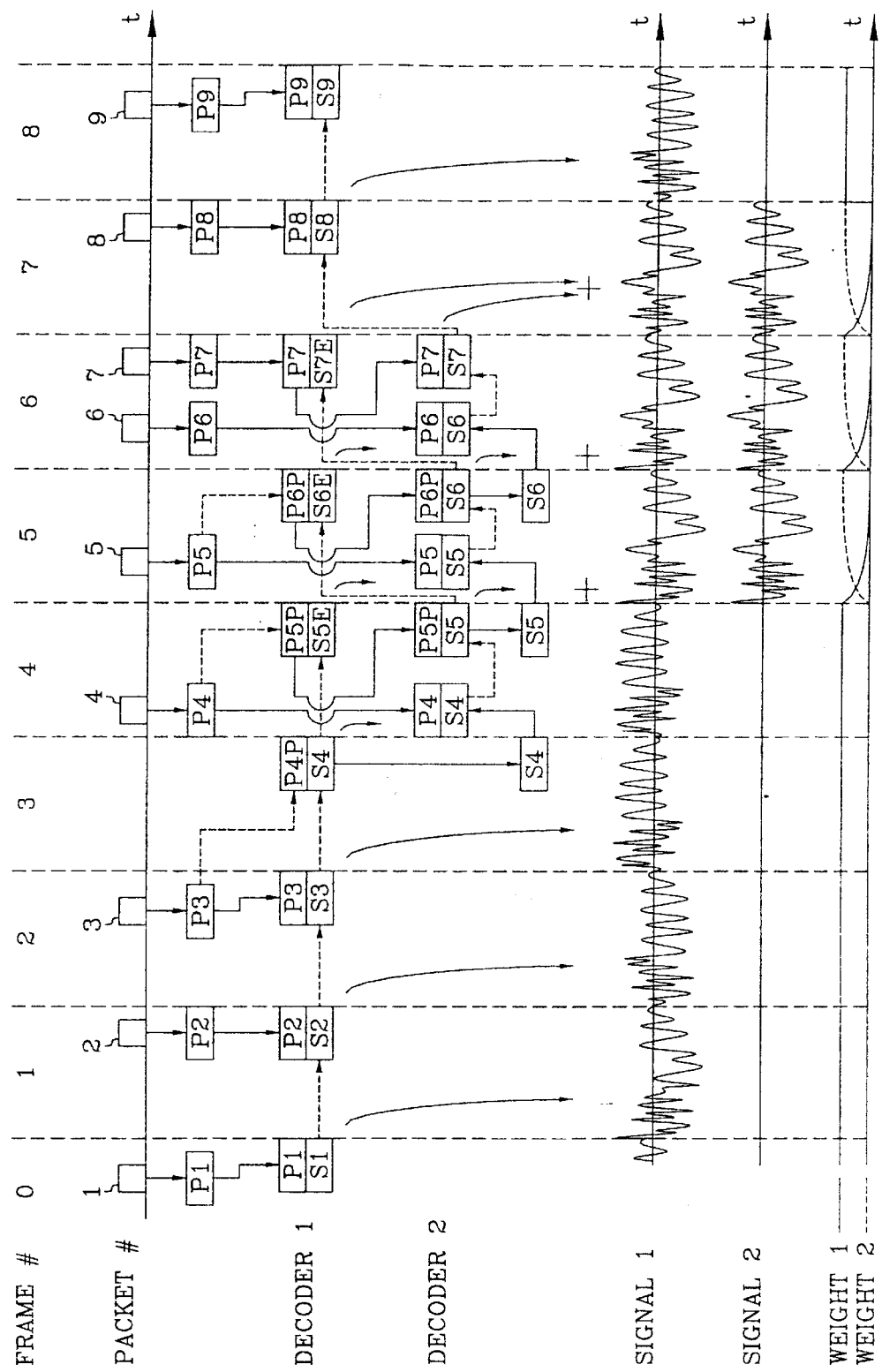
FIG. 6 is a timing diagram illustrating the delayed packet concealment method in accordance with the present invention.

FIG. 6 is a timing diagram illustrating the delayed packet concealment method in accordance with the present invention. The first three normal frames are treated in the same way as in FIGS. 4 and 5. Frame 4 is predicted in a first decoder in the same way as in FIG. 4. However, before the frame is decoded the initial decoder state S4 is copied and this copy is saved for future use. As soon as the delayed packet 4 arrives its speech parameters P4 are extracted and used in a second decoder to update the initial decoder state to the correct state S5. The actual speech samples that such a decoding would produce are ignored. The purpose of this second decoding is only to update the initial decoder state. Since packet 5 is also delayed its speech parameters will have to be predicted. However, since the more recent speech parameters P4 are now known, these parameters will be used for the prediction of parameters P5P. Furthermore, two decodings of frame 5 will be performed, namely one decoding based on predicted speech parameters P5P and erroneous initial decoder state S5E, and one decoding based on the same speech parameters and corrected initial decoder state S5. After decoding the two speech sample frames are combined to form the final output signal.

As shown at the bottom of FIG. 6 the two decoded signals are weighted, and thereafter the weighted signals are added. The weighting is performed in such a way that signal 1 from decoder 1 has a high initial weight and a low final weight (solid line), while signal 2 from decoder 2 has a low initial weight and a high final weight (dashed line). The signal may for example be combined in accordance with the formula:

$$y(n)=k(n)y_1(n)+(1-k(n))y_2(n)$$

where n denotes the sample number in the frame, $y_1(n)$ denotes decoded sample n of signal 1, $y_2(n)$ denotes decoded sample n of signal 2, and k(n) is a weighting function, for example defined as $$k(n) = 1 - \frac{\log(n)}{\log(N)}$$

where N denotes the frame size. The weighting factor k(n) may of course also be calculated in other ways. The example gives an exponentially decreasing curve as in FIG. 6. In this way there is a smooth transition from signal 1 to the more accurate signal 2.

Returning to FIG. 6, since packet 5 is delayed the correct initial decoder state S5 is copied and saved for later updating by decoder 2 when packet 5 arrives. Furthermore, since signal 2 is emphasized (due to the weighting) at the end of frame 5, the initial decoder state S6E of decoder 1 used for decoding of frame 6 is taken over from decoder 2 after decoding of frame 5. Since packet 6 is also delayed, speech parameters P6P predicted from packet 5 are used for decoding frame 6 with both the erroneous and corrected initial decoder states S6E and S6, respectively. Thereafter the two output signals are weighted and combined. Since packet 6 is delayed the correct initial decoder state S6 is copied and saved for later updating by decoder 2 when packet 6 arrives. As in the previous frame, initial decoder state S7E of decoder 1 used for decoding of frame 7 is taken over from decoder 2 after decoding of frame 6. Since packet 7 is on time, speech parameters P7 may be used for decoding without a need for prediction. Thereafter the two output signals are weighted and combined. Since packets 8 and 9 are also on time, decoder 2 is not needed anymore, and decoding may proceed as normal in decoder 1. In frame 8 initial decoder state S8 from decoder 2 is used, since this is guaranteed to be correct.

Figure 7:
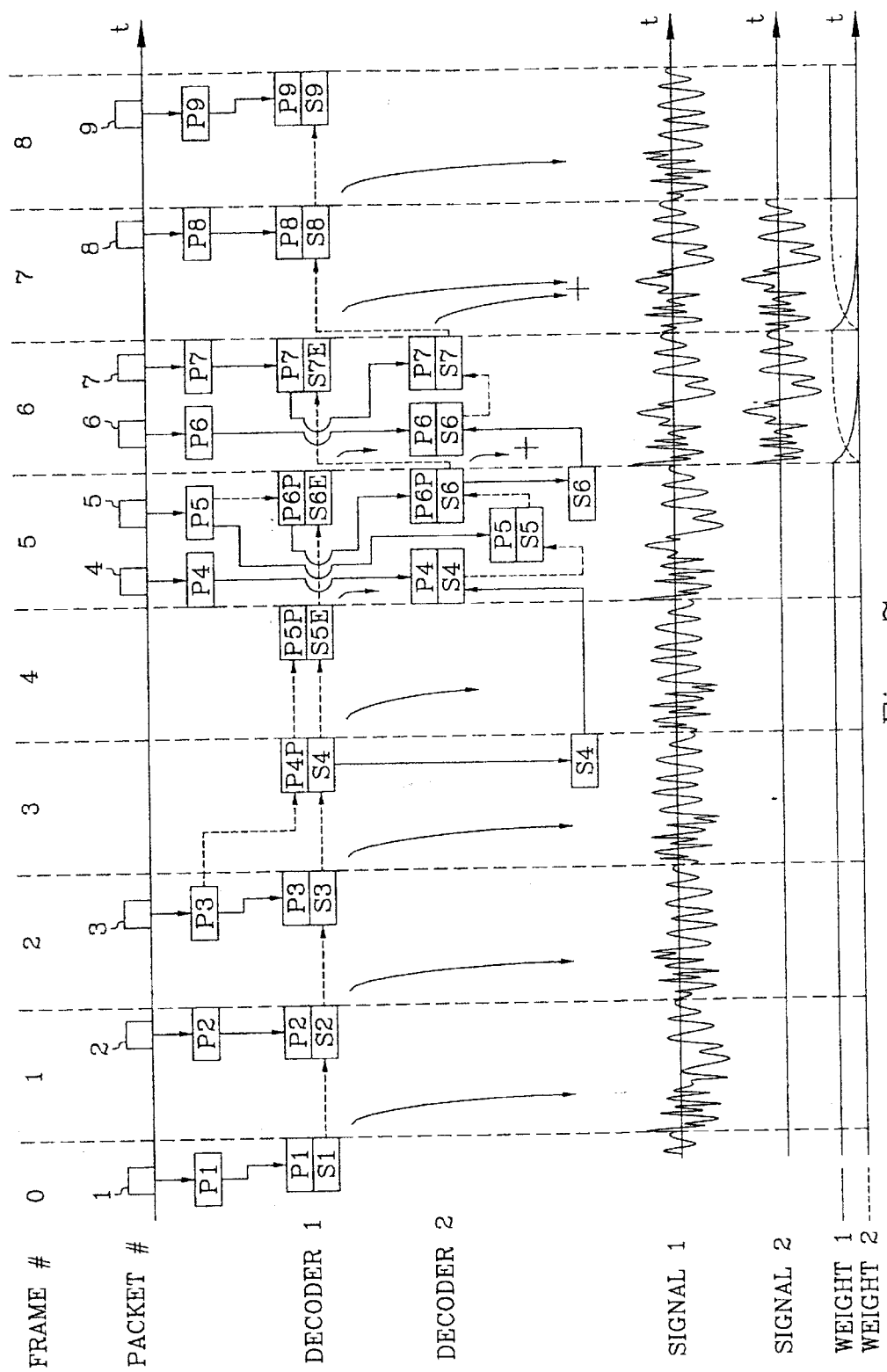
FIG. 7 is another timing diagram illustrating the delayed packet concealment method in accordance with the present invention.

FIG. 7 is another timing diagram illustrating the delayed packet concealment method in accordance with the present invention. This diagram is similar to the diagram in FIG. 6, but illustrates another case, namely when packet 4 is delayed by more than one frame. This case differs from the previous case in that conventional concealment methods have to be used in both frame 4 and 5, and in that the initial decoder state is updated twice in frame 5 due to the very late arrival of packet 4. Thereafter the same steps as in FIG. 6 are performed.

Figure 8:
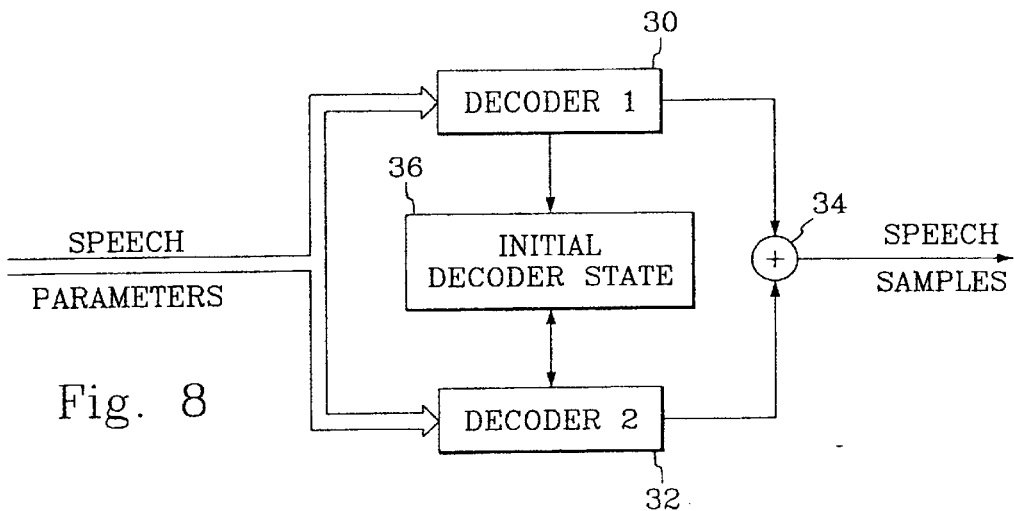
FIG. 8 is a block diagram of a delayed packet concealment apparatus in accordance with the present invention.

FIG. 8 is a block diagram of a delayed packet concealment apparatus in accordance with the present invention. Speech parameters are forwarded to two decoders 30 and 32, respectively. The output signals from these decoders are combined in an adder 34 to produce the actual speech samples. Between the decoders 30, 32 there is provided an extra memory segment 36 for storing a copy of an initial decoder state that is to be updated.

Figure 9:
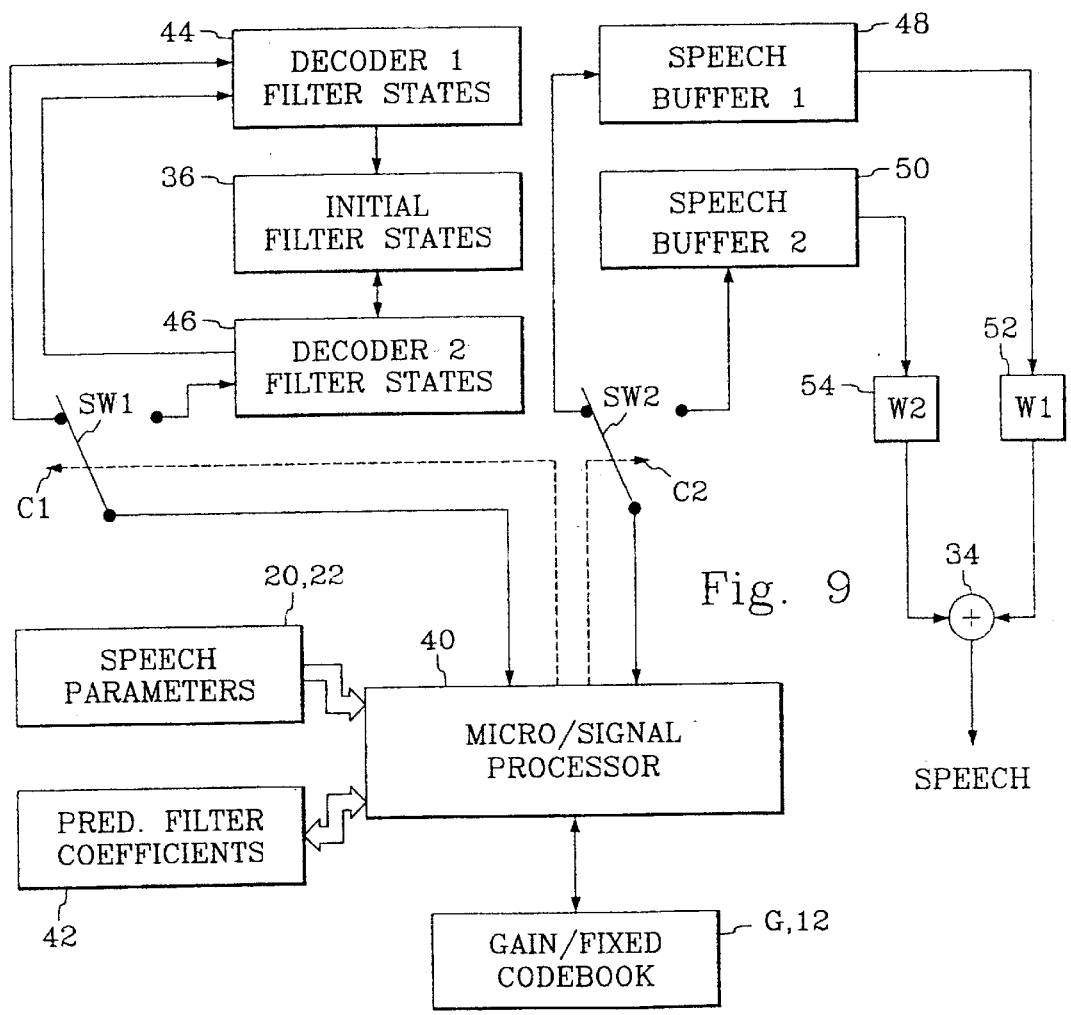
FIG. 9 is a preferred embodiment of a decoder suitable for implementing the delayed packet concealment apparatus of FIG. 8.

FIG. 9 is a preferred embodiment of a decoder suitable for implementing the delayed packet concealment apparatus of FIG. 8. This embodiment implements the decoder in accordance with the principles described with reference to FIG. 1, i.e. with digital filters in both the short-term predictor and the long-term predictor. Since decoder 2 is used only when there are delayed packets, it is actually not necessary to implement two separate decoders, of which only one is used most of the time, in hardware. In a preferred embodiment of the present invention the decoder is therefore based on a micro/signal processor combination 40, which implements both decoder 1 and decoder 2, but at different times. Processor 40 is connected to memory segments containing the gain G, fixed codebook 12, excitation parameters 20 and filter coefficients 22. A memory segment 42 is provided to store and retrieve predicted filter coefficients. Current decoder filter states for decoder 1 and decoder 2 are stored in memory segment 44 and 46, respectively. Memory segment 36 stores a copy of a correct initial filter state when a packet is delayed. Decoded speech from decoder 1 is stored in a buffer 48 and decoded speech from decoder 2 is stored in a buffer 50. Speech samples from each buffer are weighted by weighting blocks 52 and 54, respectively before they are added in adder 34. Two switches SW1, SW2 controlled by control signals C1, C2 from processor 40 determine which decoder processor 40 currently implements. If the switches are in the position shown in the figure, decoder 1 is implemented, whereas the other position implements decoder 2. A line between memory segments 46 and 44 indicates the transfer of initial filter states from decoder 2 to decoder 1, as indicated at the beginning of frames 5 and 6 in FIG. 6. This operation as well as the transfer of filter states from memory segment 44 to memory segment 36 and the transfer of filter states from memory segment 46 to memory segment 36 and back are also controlled by processor 4, but the corresponding control signals have been omitted to avoid cluttering of the figure.

Sometimes packets may arrive in the wrong order. Depending on the type of decoder such cases may require several memory segments 36 for storing initial filter states. The number of memory segments that are required to store initial filter states depends on the memory of the decoder as well as the size of a speech frame. The memory should be able to store the history of the decoder states as well as eventually received parameters during the period in which the parameters can affect the output, which of course is dependent of the encoding method. However, for a speech decoder utilizing forward prediction methods to predict the short-term behavior and a frame size of 20 ms, about 10 memory segments covering 200 ms of speech could be appropriate.

Figure 10:
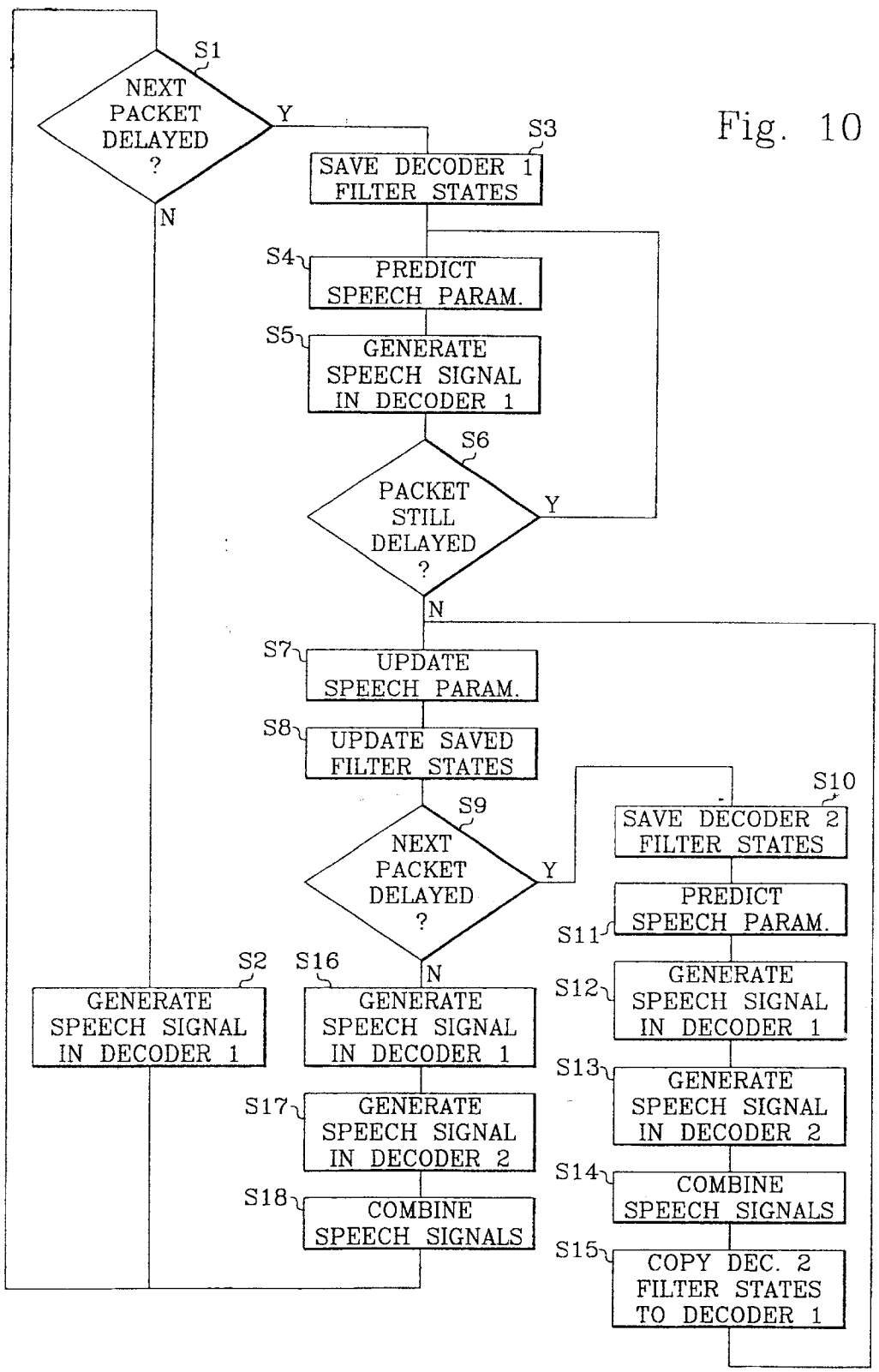
FIG. 10 is a flow chart illustrating the delayed packet concealment method of the present invention.

FIG. 10 is a flow chart illustrating the delayed packet concealment method of the present invention. In step S1 it is tested whether the next expected packet is delayed. If not, the next frame is decoded as a normal frame in decoder 1 in step S2, and thereafter the routine returns to step S1. If the packet is delayed, the latest correct filter state is saved in step S3 for later updating. Since the packet was delayed, decoder 1 performs traditional concealment by predicting the speech parameters and generating a speech frame that covers the delay in steps S4 and S5, respectively. Step S6 tests whether the expected packet is still delayed (as in FIG. 7). If this is the case, steps S4–S6 are repeated. If not, the routine proceeds to steps S7 and S8, in which the now arrived packet is used to update the speech parameters and the saved filter state. Step S9 tests whether the next packet is also delayed. If the packet is delayed, a copy of the filter state of decoder 2 is saved in step S10 for future updating. In step S11 speech parameters are predicted from the previous frame and used in steps S12 and S13 for generating output signals from decoders 1 and 2, respectively. In step S14 these output signals are combined (preferably after weighting) into a final speech frame. In step S15 the final filter state of decoder 2 is transferred to decoder 1 (as in frame 5 in FIG. 6). Thereafter the routine returns to steps S7 and S8. When a packet finally is on time again, the test in step S9 transfers the routine to steps S16 and S17, in which output signals based on correct speech parameters are generated in decoder 1 and 2, respectively. In step S18 these signals are combined (preferably after weighting). Now everything is back to normal and the routine proceeds to step S11.

The present invention has been described with reference to speech signals and corresponding speech parameters. However, it is appreciated that actually these parameters do not necessarily represent only speech. A more correct term would be audio parameters, since music and background sounds, for example, are represented in the same way. Furthermore, the same principles may also be applied to other packetized signals, such as video signals, which require digital filters for decoding. Thus, a more general term than speech or audio parameters is frame parameters, which is used in the claims. Thus, it is appreciated that concealment method of the present invention is applicable in all environments where predictable real-time data is transferred in packetized mode, and where the packets are delayed in a non-predictable way.

It will be understood by those skilled in the art that various modifications and changes may be made to the present invention without departure from the spirit and scope thereof, which is defined by the appended claims.

Citations

1 K. Cluver, "An ATM Speech Codec with Improved Reconstruction of Lost Cells", Proceedings Eusipco, 1996.

2 U.S. Pat. No. 5,615,214 (Motorola Inc.)

What is claimed is:

1. A delayed packet concealment method in a packet network that uses delayed frame parameters to improve concealment of delayed packets, said method including the following steps when a packet is delayed:
    saving a copy of an initial decoder state that existed after decoding the last nondelayed packet;
    decoding and concealing packet delay by using predicted frame parameters and said initial decoder state, thereby producing an erroneous initial decoder state;
    decoding by using updated frame parameters from said delayed packet and said saved initial decoder state, thereby producing a corrected initial decoder state;
    decoding by using a set of frame parameters and said erroneous initial decoder state, thereby producing a first output signal and a further erroneous initial decoder state;
    decoding by using said set of frame parameters and said corrected initial decoder state, thereby producing a second output signal; and
    combining said first and second output signals.

2. The method of claim 1, wherein said set of frame parameters is obtained from a packet that is not delayed.

3. The method of claim 1, wherein said set of frame parameters is predicted from a previous packet when a further packet is delayed.

4. The method of claim 3, further including:
    saving a copy of said corrected initial decoder state;
    decoding by using updated frame parameters from said further delayed packet and said saved corrected initial decoder state, thereby producing a further corrected initial decoder state;
    decoding by using a further set of frame parameters and said further erroneous initial decoder state, thereby producing a third output signal;
    decoding by using said further set of frame parameters and said further corrected initial decoder state, thereby producing a fourth output signal; and
    combining said third and fourth output signals.

5. The method of claim 4, wherein said further set of frame parameters is obtained from a packet that is not delayed.

6. The method of claim 4, wherein said further set of frame parameters is predicted from a previous packet when still another packet is delayed.

7. A decoding method in a packet network that uses delayed frame parameters to improve concealment of delayed packets, said method including the steps:
    saving a copy of a correct initial decoder state in case of packet delay;
    producing a first decoded output signal by using an erroneous initial decoder state obtained from concealment of at least one delayed packet and a set of frame parameters;
    decoding delayed packets using said saved initial decoder state in order to update said saved initial decoder state;
    producing a second decoded output signal based on said updated initial decoder state and said set of frame parameters; and
    combining said first and second output signals.

8. A delayed packet concealment apparatus in a packet network that uses delayed frame parameters to improve concealment of delayed packets, said apparatus including:
    means for saving a copy of an initial decoder state that existed after decoding the last non-delayed packet;
    means for decoding and concealing packet delay by using predicted frame parameters and said initial decoder state, thereby producing an erroneous initial decoder state;
    means for decoding by using updated frame parameters from said delayed packet and said saved initial decoder state, thereby producing a corrected initial decoder state;
    means for decoding by using a set of frame parameters and said erroneous initial decoder state, thereby producing a first output signal and a further erroneous initial decoder state;
    means for decoding by using said set of frame parameters and said corrected initial decoder state, thereby producing a second output signal; and
    means for combining said first and second output signals.

9. The apparatus of claim 8, including means for extracting said set of frame parameters from a packet that is not delayed.

10. The apparatus of claim 8, including means for predicting said set of frame parameters from a previous packet when a further packet is delayed.

11. The apparatus of claim 9, including:
    means for saving a copy of said corrected initial decoder state;
    means for decoding by using updated frame parameters from said further
    delayed packet and said saved corrected initial decoder state, thereby producing a further corrected initial decoder state;
    means for decoding by using a further set of frame parameters and said further erroneous initial decoder state, thereby producing a third output signal;
    means for decoding by using said further set of frame parameters and said further corrected initial decoder state, thereby producing a fourth output signal; and
    means for combining said third and fourth output signals.

12. The apparatus of claim 11, including means for extracting said further set of frame parameters from a packet that is not delayed.

13. The apparatus of claim 11, including means for predicting said further set of frame parameters from a previous packet when still another packet is delayed.

14. A decoder in a packet network that uses delayed frame parameters to improve concealment of delayed packets, said decoder including:

a memory for saving a copy of a correct initial decoder state in case of packet delay;

a first decoder section for producing a first decoded output signal by using an erroneous initial decoder state obtained from concealment of at least one delayed packet and a set of frame parameters;

a second decoder section used for decoding delayed packets using said saved initial decoder state in order to update said saved initial decoder state, and for producing a second decoded output signal based on said updated initial decoder state and said set of frame parameters; and means for combining said first and second output signals.

15. The decoder of claim 14, wherein said decoder sections are implemented by using a micro/signal processor combination which implements said first decoder section during first time intervals and said second decoder section during second time intervals.

* * * * *